US012602573B2

(12) United States Patent
Severa et al.

(10) Patent No.: US 12,602,573 B2
(45) Date of Patent: Apr. 14, 2026

(54) NEURAL NETWORK ROBUSTNESS VIA BINARY ACTIVATION

(71) Applicant: National Technology & Engineering Solutions of Sandia, LLC, Albuquerque, NM (US)

(72) Inventors: William Mark Severa, Albuquerque, NM (US); Craig Michael Vineyard, Cedar Crest, NM (US); Ryan Anthony Dellana, Albuquerque, NM (US); Abrar Anwar, Rosenberg, TX (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 1317 days.

(21) Appl. No.: 17/314,751

(22) Filed: May 7, 2021

(65) Prior Publication Data

US 2021/0350236 A1     Nov. 11, 2021

Related U.S. Application Data

(63) Continuation-in-part of application No. 16/146,904, filed on Sep. 28, 2018, now abandoned.

(51) Int. Cl.
G06N 3/063          (2023.01)
G06F 18/21          (2023.01)
          (Continued)

(52) U.S. Cl.
CPC ......... G06N 3/063 (2013.01); G06F 18/2113 (2023.01); G06F 18/217 (2023.01);
          (Continued)

(58) Field of Classification Search
CPC ...... G06K 9/623; G06K 9/6262; G06N 3/063; G06N 3/08; G06N 3/084; G06N 3/04;
          (Continued)

(56) References Cited

U.S. PATENT DOCUMENTS 4,874,963 A * 10/1989 Alspector .............. G06N 3/065
                                                              377/2
2015/0088795 A1* 3/2015 Golovashkin ............ G06N 3/08
                                                              706/21

(Continued)

OTHER PUBLICATIONS

Taniguchi, Yasuyuki, et al. "Activation function manipulation for fault tolerant feedforward neural networks." Proceedings Eighth Asian Test Symposium (ATS'99). IEEE, 1999: 1-6 (Year: 1999).*

(Continued)

*Primary Examiner* — Randall K. Baldwin
(74) *Attorney, Agent, or Firm* — Yee & Associates, P.C.; Gregory M. Doudnikoff

(57)          ABSTRACT

A method of increasing neural network robustness. The method comprises defining an artificial neural network comprising a number of bounded ramp activation functions. The network is trained iteratively in a layer-by-layer fashion. Each iteration increases the slope of the activation functions toward a discrete threshold activation and stops when the activation functions converge to the threshold activation and the network exhibits spiking behavior. Alternatively, weight agnostic neural networks are created, wherein nodes in the networks comprise fixed shared weights. A subset of networks is identified that comprise activation functions compatible with neuromorphic hardware and are tested with a specified number of shared weight values. A score is generated for each combination of network and weight value according to performance and mapping to neuromorphic hardware, and the networks are ranked. The networks are then combined according to ranking to create a new network that exhibits spiking behavior.

21 Claims, 9 Drawing Sheets

(51) Int. Cl.
| | |
|---|---|
| *G06F 18/2113* | (2023.01) |
| *G06N 3/045* | (2023.01) |
| *G06N 3/048* | (2023.01) |
| *G06N 3/049* | (2023.01) |
| *G06N 3/08* | (2023.01) |

(52) U.S. Cl.
CPC ............. *G06N 3/045* (2023.01); *G06N 3/048* (2023.01); *G06N 3/049* (2013.01); *G06N 3/08* (2013.01)

(58) Field of Classification Search
CPC .... G06N 3/0451; G06N 3/048; G06N 3/0481; G06N 3/045; G06N 3/049; G06N 3/0635; G06F 18/217; G06F 18/2113
See application file for complete search history.

(56) References Cited

U.S. PATENT DOCUMENTS

| | | | | |
|---|---|---|---|---|
| 2015/0106316 A1* | 4/2015 | Birdwell | ................ | G06N 3/086 |
| | | | | 706/33 |
| 2016/0321542 A1* | 11/2016 | Towal | ...................... | G06N 7/01 |
| 2018/0068218 A1* | 3/2018 | Yoo | ......................... | G06V 20/00 |
| 2018/0174033 A1* | 6/2018 | Davies | ................... | G06N 3/063 |
| 2018/0174042 A1* | 6/2018 | Srinivasa | ............... | G06N 3/088 |
| 2019/0340500 A1* | 11/2019 | Olmschenk | .............. | G06N 3/04 |
| 2020/0322500 A1* | 10/2020 | Mogaki | .............. | H04N 1/00209 |

OTHER PUBLICATIONS

Plagianakos, et al. "Training neural networks with threshold activation functions and constrained integer weights." Proceedings of the IEEE-INNS-ENNS IJCNN 2000. Neural Computing: New Challenges and Perspectives for the New Millennium. vol. 5. IEEE, 2000: 161-166 (Year: 2000).*

Huang, Guang-Bin, et al. "Can threshold networks be trained directly ?. " IEEE Transactions on Circuits and Systems II: Express Briefs 53.3 (2006): 187-191. (Year: 2006).*

Soltiz, Michael. "Hardware neuromorphic learning systems utilizing memristive devices." (2012): i-65 (Year: 2012).*

Soltiz, Michael, et al. "Memristor-based neural logic blocks for nonlinearly separable functions." IEEE Transactions on computers 62.8 (2013): 1597-1606. (Year: 2013).*

Jeyanthi, S. et al. "Implementation of single neuron using various activation functions with FPGA." 2014 IEEE International Conference on Advanced Communications, Control and Computing Technologies. IEEE, 2014: 1126-1131 (Year: 2014).*

Abrol, Sahil, and Rita Mahajan. "Implementation of single artificial neuron using various activation functions and XOR gate on FPGA chip." 2015 Second international conference on advances in computing and communication engineering. IEEE, 2015: 118-123. ( Year: 2015).*

Severa, William, et al. "Spiking network algorithms for scientific computing." 2016 IEEE international conference on rebooting computing (ICRC). IEEE, 2016. (Year: 2016).*

Hill, Aaron J., et al. "A spike-timing neuromorphic architecture." 2017 IEEE International Conference on Rebooting Computing (ICRC). IEEE, 2017: 1-8 (Year: 2017).*

Verzi, Stephen J., et al. "Optimization-based computation with spiking neurons." 2017 International Joint Conference on Neural Networks (IJCNN). IEEE, 2017: 2015-2022 (Year: 2017).*

James, Conrad D., et al. "A historical survey of algorithms and hardware architectures for neural-inspired and neuromorphic computing applications." Biologically Inspired Cognitive Architectures 19 (2017): 49-64. (Year: 2017).*

Draelos, Timothy J., et al. "Neurogenesis deep learning: Extending deep networks to accommodate new classes." 2017 International Joint Conference on Neural Networks (IJCNN). IEEE, 2017: 526-533 (Year: 2017).*

Smith, Michael R., et al. "A novel digital neuromorphic architecture efficiently facilitating complex synaptic response functions applied to liquid state machines." 2017 International Joint Conference on Neural Networks (IJCNN). IEEE, 2017: 2421-2428 (Year: 2017).*

Severa, William, et al. "Spiking neural algorithms for markov process random walk." 2018 International Joint Conference on Neural Networks (IJCNN). IEEE, Jul. 2018. (Year: 2018).*

Severa, William, et al. "Whetstone: A method for training deep artificial neural networks for binary communication." arXiv preprint arXiv: 1810.11521 (2018). (Year: 2018).*

Bouvier, Maxence, et al. "Spiking neural networks hardware implementations and challenges: A survey." ACM Journal on Emerging Technologies in Computing Systems (JETC) 15.2 (2019): 1-35. (Year: 2019).*

Valencia, Daniel, and Amir Alimohammad. "Neural spike sorting using binarized neural networks." IEEE Transactions on Neural Systems and Rehabilitation Engineering 29 (2020): 206-214. (Year: 2020).*

Aimone, James Bradley, et al. Mosaics, The Best of Both Worlds: Analog devices with Digital Spiking Communication to build a Hybrid Neural Network Accelerator. No. SAND-2020-10583. Sandia National Lab.(SNL-NM), Albuquerque, NM (United States), 2020. (Year: 2020).*

Severa W. et al., "Training Deep Neural Networks for Binary Communication with the Whetstone Method," Nature Machine Intelligence, vol. 1, Feb. 2019, pp. 86-94.

Gaier, A. and Ha, D., "Weight Agnostic Neural Networks," 33rd Conference on Neural Information Processing Systems (NeurIPS 2019), Vancouver, Canada, 19 pages.

* cited by examiner

600

602 — DEFINE MODEL (KERAS)

604

606 — STANDARD TRAINING

608 — SHARPEN LAYER 1

TRAINING WHETSTONE IN KERAS

610 — SHARPEN LAYER N

612 — OUTPUT MODEL (KERAS)

616

EVALUATE PERFORMANCE

EVALUATE PERFORMANCE $n \geq p$ $d \leq \bar{d}$ $n < p$

WAIT $d > \bar{d}$

SHARP $e > S_0$ $s = 1.0$

618

START → WAIT

DONE $e \leq S_0$

614

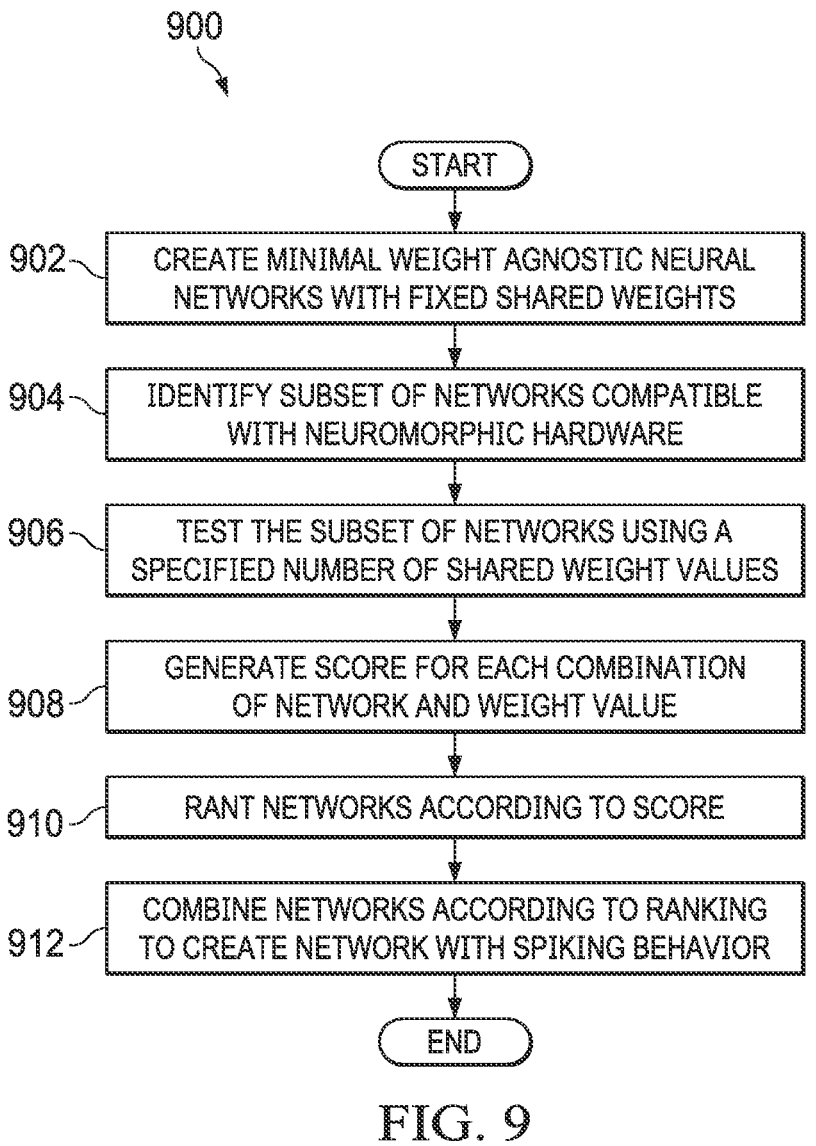

900

START

902 — CREATE MINIMAL WEIGHT AGNOSTIC NEURAL NETWORKS WITH FIXED SHARED WEIGHTS

904 — IDENTIFY SUBSET OF NETWORKS COMPATIBLE WITH NEUROMORPHIC HARDWARE

906 — TEST THE SUBSET OF NETWORKS USING A SPECIFIED NUMBER OF SHARED WEIGHT VALUES

908 — GENERATE SCORE FOR EACH COMBINATION OF NETWORK AND WEIGHT VALUE

910 — RANT NETWORKS ACCORDING TO SCORE

912 — COMBINE NETWORKS ACCORDING TO RANKING TO CREATE NETWORK WITH SPIKING BEHAVIOR

END

FIG. 9

NEURAL NETWORK ROBUSTNESS VIA BINARY ACTIVATION

CROSS-REFERENCE TO RELATED APPLICATION

This application is a continuation-in-part of U.S. patent application Ser. No. 16/146,904, filed Sep. 28, 2018, entitled "System and Method for Training Deep Artificial Neural Networks," the entirety of which is incorporated herein by reference.

STATEMENT OF GOVERNMENT INTEREST

This invention was made with United States Government support under Contract No. DE-NA0003525 between National Technology & Engineering Solutions of Sandia, LLC and the United States Department of Energy. The United States Government has certain rights in this invention.

BACKGROUND

1. Field

The present disclosure relates generally to artificial neural networks and to systems and methods for training artificial neural networks.

2. Background

Artificial neural networks are computing systems inspired by the biological networks that constitute animal brains. An artificial neural network comprises a collection of connected units or nodes called artificial neurons. An artificial neuron in an artificial neural network may receive a number of signals from input to the artificial neural network or from other artificial neurons in the artificial neural network. The artificial neuron then processes the received signals to generate an output signal. The output signal from the artificial neuron is provided to other artificial neurons that are connected to it in the artificial neural network or to the output of the artificial neural network itself.

Neuromorphic computing introduces a novel computational paradigm that offers low energy usage. This non-Von Neumann architecture relies on event-based spiking communication between neurons, similar to that of the brain. Neuromorphic computing introduces a novel computational paradigm that offers low energy usage. This non-Von Neumann architecture relies on event-based spiking communication between neurons, similar to that of the brain. Neuromorphic processors can potentially offer milliwatt scale computation while maintaining state-of-the-art-performance.

In standard deep learning (DL) neural networks (NNs), and specifically with convolutional neural networks (CNNs), algorithm performance is generally brittle to noise introduced to the system. the noise can be naturally occurring (due to sensor noise or environmental noise) or it can be the result of 'adversarial' attacks.

Therefore, it would be desirable to have a method and apparatus that take into account at least some of the issues discussed above, as well as other possible issues.

SUMMARY

An illustrative embodiment provides a computer-implemented method of increasing neural network robustness.

The method comprises defining an artificial neural network, wherein the artificial neural network comprises a number of bounded ramp activation functions. The artificial neural network is trained iteratively in a layer-by-layer fashion, wherein each iteration of training increases the slope of the bounded ramp activation functions toward a discrete threshold activation. Training of the artificial neural network stops when the activation functions converge to the threshold activation and the artificial neural network exhibits spiking behavior.

Another embodiment provides a computer program product for increasing neural network robustness. The computer program product comprises a computer-readable storage medium having program instructions embodied thereon to perform the steps of: defining an artificial neural network, wherein the artificial neural network comprises a number of bounded ramp activation functions; iteratively training the artificial neural network in a layer-by-layer fashion, wherein each iteration of training increases the slope of the bounded ramp activation functions toward a discrete threshold activation; and stopping training of the artificial neural network when the activation functions converge to the threshold activation and the artificial neural network exhibits spiking behavior.

Another embodiment provides a system for increasing neural network robustness. The system comprises a storage device configured to store program instructions, and one or more processors operably connected to the storage device and configured to execute the program instructions to cause the system to: define an artificial neural network, wherein the artificial neural network comprises a number of bounded ramp activation functions; iteratively train the artificial neural network in a layer-by-layer fashion, wherein each iteration of training increases the slope of the bounded ramp activation functions toward a discrete threshold activation; and stop training of the artificial neural network when the activation functions converge to the threshold activation and the artificial neural network exhibits spiking behavior.

Another embodiment provides a computer-implement method of increasing neural network robustness. The method comprises creating a number of minimal weight agnostic neural networks, wherein nodes in the neural networks comprise fixed shared weights. A subset of the neural networks is identified that comprise activation functions compatible with neuromorphic hardware. Each neural network in the subset is tested with a specified number of shared weight values. A score is generated for each combination of a neural network in the subset and a share weight value, wherein the score is based on performance and complexity in mapping to neuromorphic hardware, and the neural networks in the subset are ranked according to their respective scores. Neural networks from the subset are then combined according to ranking to create a new network that exhibits spiking behavior.

Another embodiment provides a computer program product for increasing neural network robustness. The computer program product comprises a computer-readable storage medium having program instructions embodied thereon to perform the steps of: creating a number of minimal weight agnostic neural networks, wherein nodes in the neural networks comprise fixed shared weights; identifying a subset of the neural networks that comprises activation functions compatible with neuromorphic hardware; testing each neural network in the subset with a specified number of shared weight values; generating a score for each combination of a neural network in the subset and a shared weight value, wherein the score is based on performance and complexity in mapping to neuromorphic hardware; ranking the neural networks in the subset according to their respective scores; and combining neural networks from the subset according to ranking to create a new network that exhibits spiking behavior.

Another embodiment provides a system for increasing neural network robustness. The system comprising a storage device configured to store program instructions, and one or more processors operably connected to the storage device and configured to execute the program instructions to cause the system to: create a number of minimal weight agnostic neural networks, wherein nodes in the neural networks comprise fixed shared weights; identify a subset of the neural networks that comprises activation functions compatible with neuromorphic hardware; test each neural network in the subset with a specified number of shared weight values; generate a score for each combination of a neural network in the subset and a shared weight value, wherein the score is based on performance and complexity in mapping to neuromorphic hardware; rank the neural networks in the subset according to their respective scores; and combine neural networks from the subset according to ranking to create a new network that exhibits spiking behavior.

The features and functions can be achieved independently in various examples of the present disclosure or may be combined in yet other examples in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 9 depicts a flowchart illustrating a process for increasing neural network robustness in accordance with illustrative embodiments.

DETAILED DESCRIPTION

The illustrative embodiments recognize and take into account one or more different considerations. For example, the illustrative embodiments recognize and take into account that a deep neural network that is trained using relatively high-powered graphics processing unit clusters is hence designed to operate on a system with a central processing unit (CPU) and a graphics processing unit (GPU). However, it may be desirable for a deep neural network to be implemented on a lower-power embedded platform or in another application where a central processing unit and graphics processing unit are not used.

Illustrative embodiments thus recognize and take into account that conventional processes for training an artificial neural network may not take into account the limitations of the ultimate target platform on which the artificial neural network will be implemented. For example, artificial neural network training using conventional gradient descent backpropagation is not well suited for training an artificial neural network that is to be implemented on reduced precision spiking or otherwise binary neuromorphic hardware.

The illustrative embodiments also recognize and take into account that in standard deep learning neural networks, and specifically with convolutional neural networks, algorithm performance is generally brittle to noise introduced to the system. In most studied cases, this noise is introduced at the inputs. For example, the noise can be naturally occurring (e.g., due to sensor noise or environmental noise) or it can be the result of "adversarial" attacks. In an adversarial attack, the general idea is to alter an input slightly such that the deep learning-based classifier is tricked into producing a drastically different result. The literature has numerous examples of this directed adversarial attack effectively defeating classifiers. The less-studied cases involve noise that occurs throughout the algorithm, which represents a class of situations such as radiation-induced single-event upsets. Another example is device variability. As new devices are developed and explored, noise can be an issue given that a key strength of digital computation is confidence in the values computer devices produce.

The illustrative embodiments provide a method of developing neural network algorithms (particularly classifiers) for deep learning tasks that are robust to noise and so-called adversarial attacks. By using binary (0 or 1) activation functions in place of traditional floating-point precision, the neural networks of the illustrative embodiments are designed to leverage diffuse and sparse information thereby improving performance under conditions introducing artifacts into the signal (either unintentional noise or intentional adversarial attacks).

Figure 1:
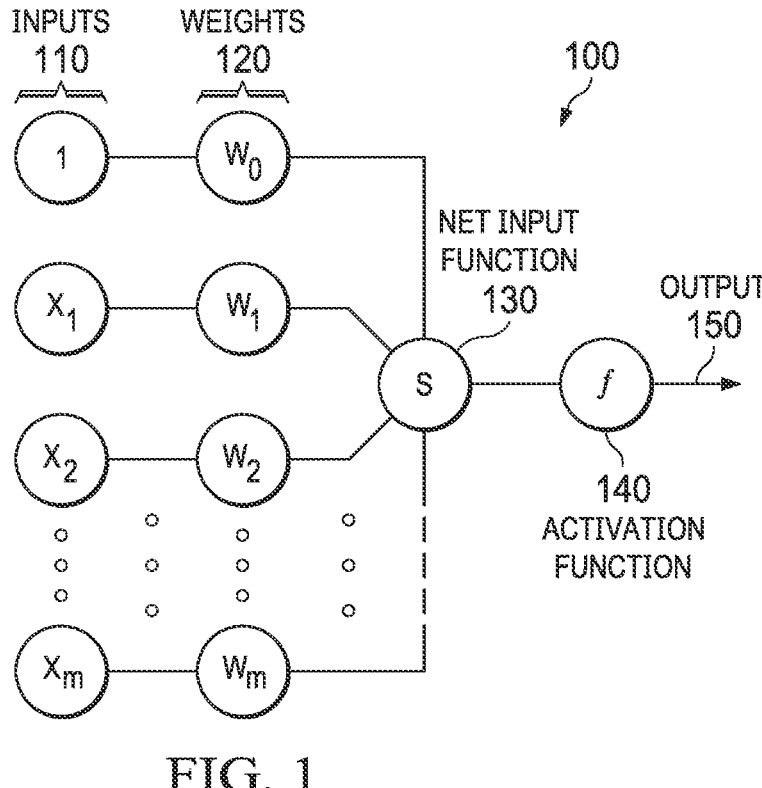
FIG. 1 depicts a diagram illustrating a node in a neural network with which illustrative embodiments can be implemented.

FIG. 1 depicts a diagram illustrating a node in a neural network with which illustrative embodiments can be implemented. Node (artificial neuron) 100 combines multiple inputs 110 from other nodes. Each input 110 is multiplied by a respective weight 120 that either amplifies or dampens that input, thereby assigning significance to each input for the task the algorithm is trying to learn. The weighted inputs are collected by a net input function 130 and then passed through an activation function 140 to determine the output 150. The connections between nodes are called edges. The respective weights of nodes and edges might change as learning proceeds, increasing, or decreasing the weight of the respective signals at an edge. A node might only send a signal if the aggregate input signal exceeds a predefined threshold. Pairing adjustable weights with input features is how significance is assigned to those features with regard to how the network classifies and clusters input data.

Neural networks are often aggregated into layers, with different layers performing different kinds of transformations on their respective inputs. A node layer is a row of nodes that turn on or off as input is fed through the network. Signals travel from the first (input) layer to the last (output) layer, passing through any layers in between, possibly traversing some or all of the layers multiple times. Each layer's output acts as the next layer's input.

Figure 2:
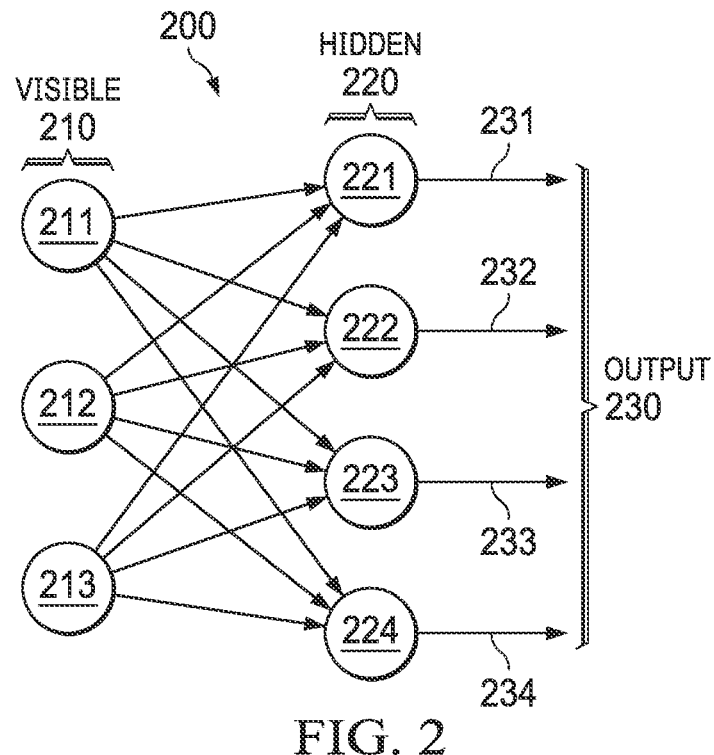
FIG. 2 depicts a diagram illustrating a neural network in which illustrative embodiments can be implemented.

FIG. 2 depicts a diagram illustrating a neural network in which illustrative embodiments can be implemented. As shown in FIG. 2, the nodes in the neural network 200 are divided into a layer of visible nodes 210 and a layer of hidden nodes 220. The nodes in these layers might comprise nodes such as node 100 in FIG. 1. The visible nodes 210 are those that receive information from the environment (i.e., a set of external training data). Each visible node in layer 210 takes a low-level feature from an item in the dataset and passes it to the hidden nodes in the next layer 220. When a node in the hidden layer 220 receives an input value x from a visible node in layer 210 it multiplies x by the weight assigned to that connection (edge) and adds it to a bias b. The result of these two operations is then fed into an activation function which produces the node's output.

In fully connected feed-forward networks, each node in one layer is connected to every node in the next layer. For example, node 221 receives input from all of the visible nodes 211-213 each x value from the separate nodes is multiplied by its respective weight, and all of the products are summed. The summed products are then added to the hidden layer bias, and the result is passed through the activation function to produce output 231. A similar process is repeated at hidden nodes 222-224 to produce respective outputs 232-234. In the case of a deeper neural network, the outputs 230 of hidden layer 220 serve as inputs to the next hidden layer.

Neural network layers can be stacked to create deep networks. After training one neural net, the activities of its hidden nodes can be used as inputs for a higher level, thereby allowing stacking of neural network layers. Such stacking makes it possible to efficiently train several layers of hidden nodes. Examples of stacked networks include deep belief networks (DBN), recurrent neural networks (RNN), convolutional neural networks (CNN), and spiking neural networks (SNN).

Artificial neural networks are configured to perform particular tasks by considering examples, generally without task-specific programming. The process of configuring an artificial neural network to perform a particular task may be referred to as training. An artificial neural network that is being trained to perform a particular task may be described as learning to perform the task in question.

A typical process for training an artificial neural network may include providing an input having a known desired output. The input is propagated through the neural network until an output is produced at the output layer of the network. The output is then compared to the desired output, using a loss function. The resulting error value is calculated for each of the artificial neurons (nodes) in the output layer of the neural network. The error values are then propagated from the output back through the artificial neural network, until each artificial neuron in the network has an associated error value that reflects its contribution to the original output. Backpropagation uses these error values to calculate the gradient of the loss function. This gradient is used by an optimization method to update the weights in the artificial neural network in an attempt to minimize the loss function. This process of propagation and weight update is then repeated for other inputs having known desired outputs.

An artificial neural network may be implemented as a neural network model running on conventional computer processor hardware, such as a central processor unit (CPU) and a graphical processor unit (GPU). Alternatively, an artificial neural network may be implemented on neuromorphic hardware. Neuromorphic hardware may comprise very-large-scale integration (VLSI) systems containing electronic analog circuits that mimic neuro-biological architectures present in the nervous system. Neuromorphic hardware may include analog, digital, mixed-mode analog and digital VLSI, and software systems that implement models of neural systems. Neuromorphic hardware may thus be used to implement artificial neural networks directly in hardware. An artificial neural network implemented in neuromorphic hardware may be faster and more efficient than running a neural network model on conventional computer hardware.

For example, an artificial neural network may be implemented in a relatively low-power neuromorphic hardware architecture comprising simple spiking neuron processing elements. Such an artificial neural network may be referred to as a spiking neural network (SNN). The spiking neurons in a spiking neural network are artificial neurons that are configured to fire only when a state of the neuron reaches a specific value. Whereas other types of neural networks communicate using continuous activation values, communication in SNNs is done by broadcasting trains of action potentials, known as spike trains. In biological systems, a spike is generated when the sum of changes in a neuron's membrane potential resulting from pre-synaptic stimulation crosses a threshold. This principle is simulated in artificial SNNs in the form of a signal accumulator that fires when a certain type of input surpasses a threshold. The intermittent occurrence of spikes gives SNNs the advantage of much lower energy consumption than other types of neural networks.

A leaky integrate-and-fire (LIF) neuron continually integrates the energy provided by inputs until a threshold is reached and the neuron fires as a spike that provides input to other neurons via synapse connections. By emitting this spike, the neuron is returned to a low energy state and continues to integrate input current until its next firing. Throughout this process, the energy stored in the neuron continually leaks. If insufficient input is provided within a specified time frame, the neuron gradually reverts to a low energy state. This prevents the neuron from indefinitely retaining energy.

When a spiking neuron fires, it generates a signal which travels to other spiking neurons in the SNN which, in turn, changes the state (activation level) of the other spiking neurons in accordance with this signal. Incoming signals may push the value of this activation level higher, causing the spiking neuron to fire if the activation level now exceeds the threshold level, and then decay over time.

A spiking neuron is an example of a binary artificial neuron. A binary artificial neuron has an output that may be said to be in one of two possible states (i.e., fired or not-fired).

Neuromorphic computing introduces a novel computational paradigm that offers low energy usage. This non-Von Neumann architecture relies on event-based spiking communication between neurons, similar to that of the brain. Neuromorphic processors offer milliwatt scale computation while maintaining state-of-the-art performance. Neuromorphic hardware implementing an architecture of spiking neurons or otherwise binary artificial neurons may be referred to as reduced-precision neuromorphic hardware. Reduced-precision neuromorphic hardware may have less precision than neuromorphic hardware implementing a network of artificial neurons that have more than two possible output states, such as artificial neurons having a continuous range of possible output states.

Figure 3:
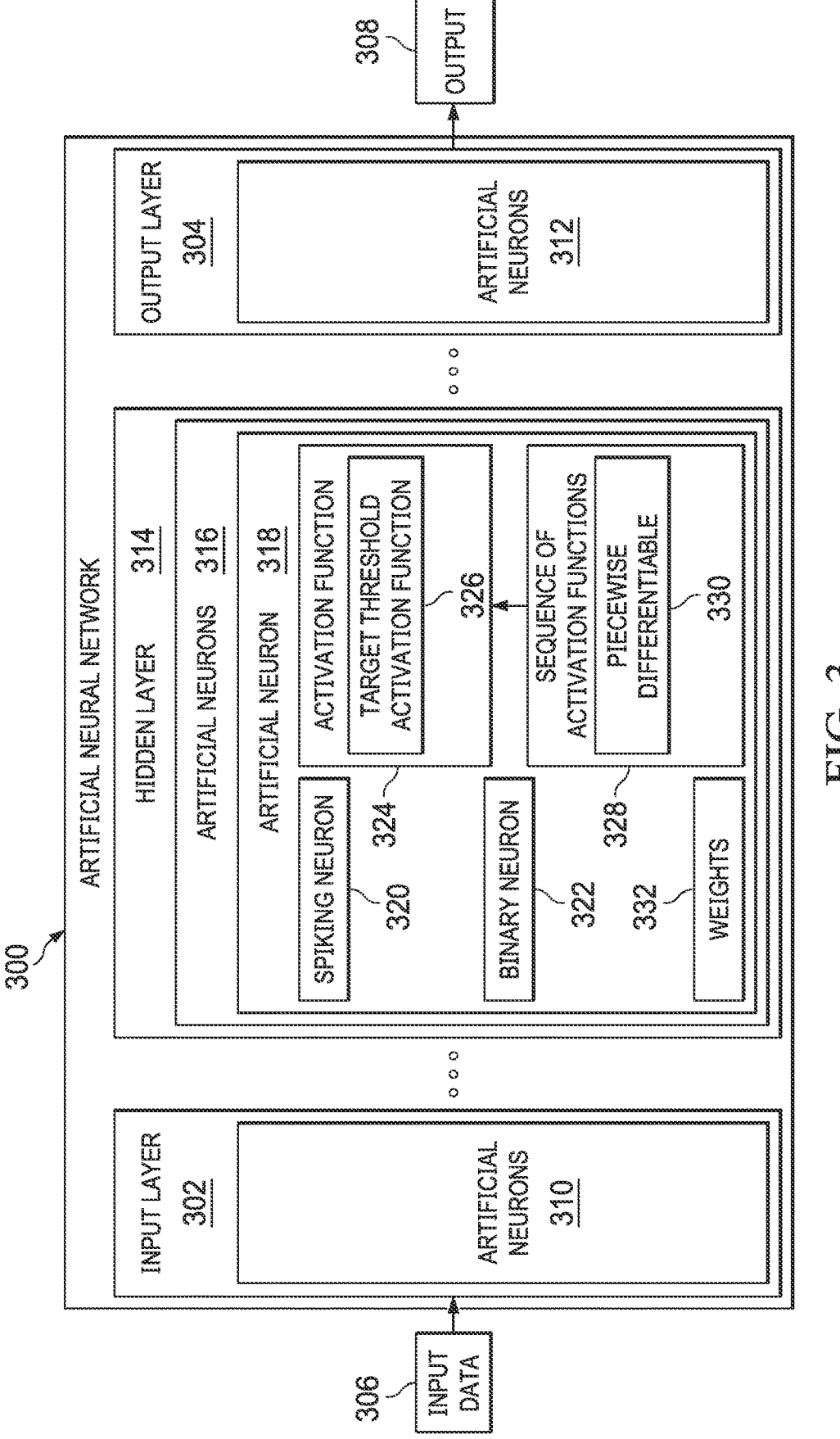
FIG. 3 depicts an illustration of a block diagram of an artificial neural network in accordance with an illustrative embodiment.

Turning to FIG. 3, an illustration of a block diagram of an artificial neural network is depicted in accordance with an illustrative embodiment. Artificial neural network 300 may comprise a plurality of layers. For example, without limitation, artificial neural network 300 may be deep neural network comprising input layer 302, output layer 304, and a number of hidden layers between input layer 302 and output layer 304. Input layer 302 may be configured to receive input data 306 for processing by artificial neural network 300. Processed data may be provided at output 308 of artificial neural network 300 from output layer 304. Input layer 302 may comprise artificial neurons 310. Output layer 304 may comprise artificial neurons 312.

Any appropriate number of hidden layers may be between input layer 302 and output layer 304. Hidden layer 314 is an example of one of such hidden layers. Hidden layer 314 may include any appropriate number of artificial neurons 316.

Each artificial neuron 318 in artificial neurons 316 may be, for example, without limitation, a spiking neuron 320 or a binary neuron 322. In any case, the output of artificial neuron 318 is dependent on the input as processed by activation function 324 for artificial neuron and as modified by various weights 332.

A conventional artificial neural network may be trained by adjusting the weights associated with the artificial neurons in the artificial neural network. In accordance with an illustrative embodiment, however, both weights 332 and activation function 324 for artificial neuron 318 may be adjusted during training.

In accordance with an illustrative embodiment, activation function 324 of artificial neuron 318 may be selectively modified until target threshold activation function 326 is determined as the activation function 324 for artificial neuron 318. For example, without limitation, activation function 324 may be selectively modified during training by selecting activation function 324 from sequence of activation functions 328. For example, activation functions in sequence of activation functions 328 may be piecewise differentiable 330.

The illustration of artificial neural network 300 in FIG. 3 is not meant to imply physical or architectural limitations to the manner in which illustrative embodiments may be implemented. Other components, in addition to or in place of the ones illustrated, may be used. Some components may be optional. Also, the blocks are presented to illustrate some functional components. One or more of these blocks may be combined, divided, or combined and divided into different blocks when implemented in an illustrative embodiment.

Figure 4:
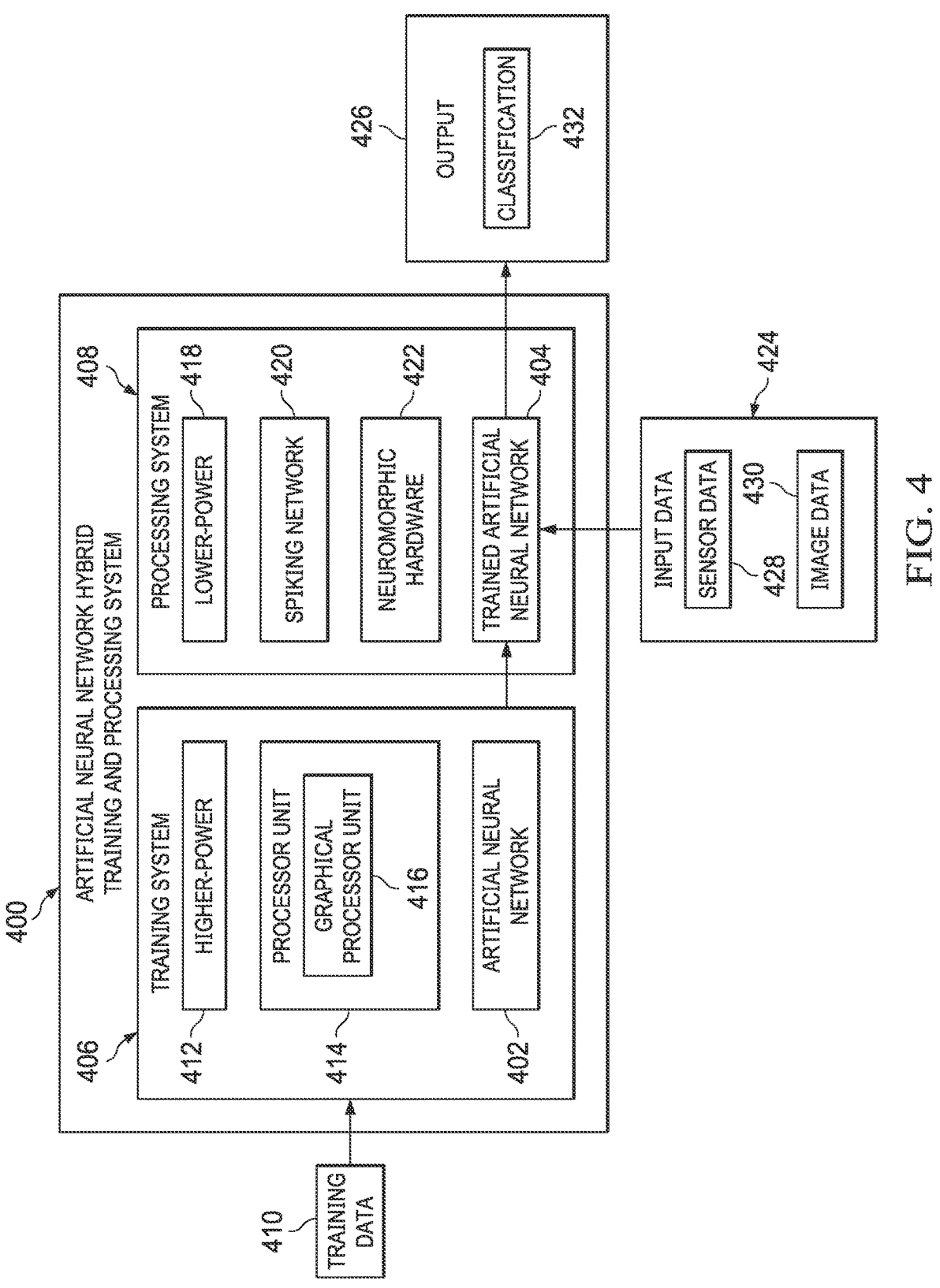
FIG. 4 depicts an illustration of a block diagram of an artificial neural network hybrid training and processing system in accordance with an illustrative embodiment.

Turning to FIG. 4, an illustration of a block diagram of an artificial neural network hybrid training and processing system is depicted in accordance with an illustrative embodiment. Artificial neural network hybrid training and processing system 400 is configured to train artificial neural network 402 and to use trained artificial neural network 404 to process data. Trained artificial neural network 404 may be an example of one implementation of artificial neural network 300 in FIG. 3.

Artificial neural network hybrid training and processing system 400 comprises training system 406 and processing system 408. Training system 406 is configured to train artificial neural network 402 using training data 410 in accordance with the illustrative embodiment describe herein by selectively modifying activation functions of artificial neurons in artificial neural network 402 until the activation functions for the artificial neurons are target threshold activation functions. Training system 406 may be a relatively higher-power 412 system. For example, training system 406 may train artificial neural network 402 using a relatively high-power processor unit 414, such as a graphical processor unit (GPU) 416.

Trained artificial neural network 404 may be transferred to processing system 408. Processing system 408 may be a relatively lower-power 418 system. For example, processing system 408 may comprise spiking network 420 implemented on neuromorphic hardware 422.

Processing system 408 may be configured to use trained artificial neural network 404 to process any appropriate input data 424 to provide any appropriate output 426. For example, processing system 408 may be configured to process sensor data 428, such as image data 430, to determine classification 432 of the information in sensor data 428.

The illustrative embodiments provide a method for training binary-activation neural networks (BANNs). BANNs are a special class of deep learning neural networks in that the activation function takes only values 0 and 1, meaning the individual neurons (nodes) in the system communicate with one another using 0 and 1 rather than an integer or floating-point precision value. Traditionally, training such a network is difficult due to the lack of a well-defined gradient. The method of the illustrative embodiments was developed originally for computational performance advantages expected through compatibility with neuromorphic hardware. However, subsequent research has discovered that the features that trigger network activation in BANNs may differ considerably from those in traditional neural networks. It appears the features are more diffuse and less dependent on any particular input dimension. This feature resulted in additional testing with results suggesting that BANNs trained according to the present method are at times more robust to random noise.

A BANN trained according to the illustrative embodiments can be instantiated in-hardware for deep learning tasks (e.g., classification, segmentation, etc.) and that this performance would be robust to noise (i.e., unintentional, environmental, adversarial). The illustrative embodiments are independent of the sensor type and apply to many industries areas (e.g., security, transportation, manufacturing, biomedical).

For spiking neuromorphic hardware to be useful it is necessary to convert an artificial neural network (ANN), for which communication between artificial neurons can be high precision, to a spiking neural network (SNN). The conversion of ANNs to SNNs is non-trivial, as ANNs depend on gradient-based backpropagation training algorithms, which require high-precision communication, and the resultant networks effectively assume the persistence of that precision. While there are methods for converting existing ANNs to SNNs, these transformations often require using representations that diminish the benefits of spiking. The illustrative embodiments employ a new approach to training SNNs, wherein the ANN training is to not only learn the task, but to produce a SNN in the process. Specifically, if the training procedure can include the eventual objective of low precision communication between nodes, the training process of a SNN can be nearly as effective as a comparable ANN. This method is agnostic to both the type of ANN being trained and the targeted neuromorphic hardware.

Figure 5:
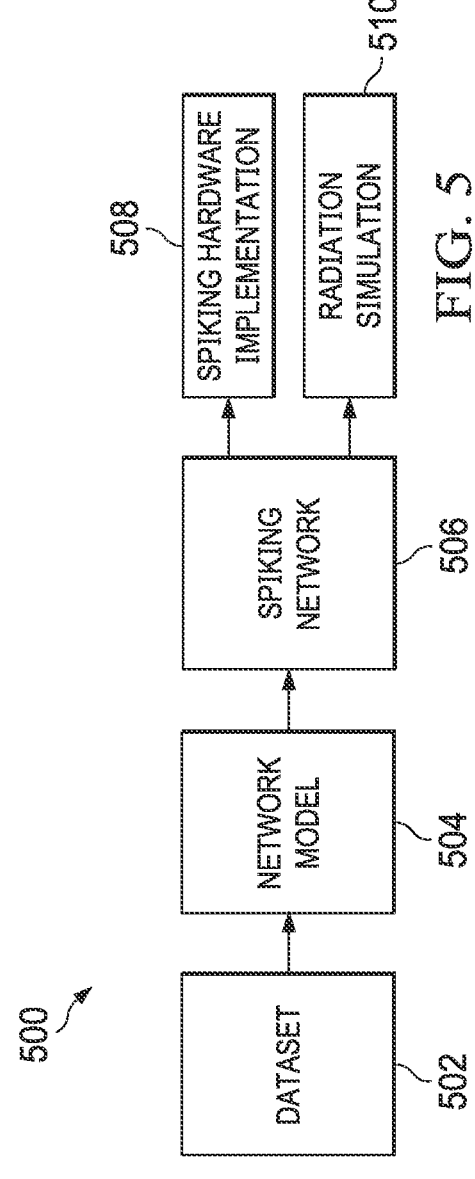
FIG. 5 depicts a diagram illustrating a spiking deep learning workflow in accordance with an illustrative embodiment.

FIG. 5 depicts a diagram illustrating a spiking deep learning workflow in accordance with an illustrative embodiment. Process 500 begins by defining a dataset 502 for training an ANN. Dataset 502 can be used to classify temporal events.

In an embodiment, the dataset 502 is viewed as a classification task (event/no event) because a classification network provides a prototype for evaluation of a neural network with clear metrics. For an anomaly detection task, the neural network build a model of "normal" behavior and identifies events of interest without needing pre-labeled events. Classification is a first step to anomaly detection, which can test the ability of spiking networks to generalize compared to standards ANNs.

A network model 504 is constructed using industry standard tools such as, e.g., Tensorflow®. Network model 504 might comprise a convolutional neural network (CNN). Network model 504 might be designed manually or with network architecture search methods (NAS).

Figure 6:
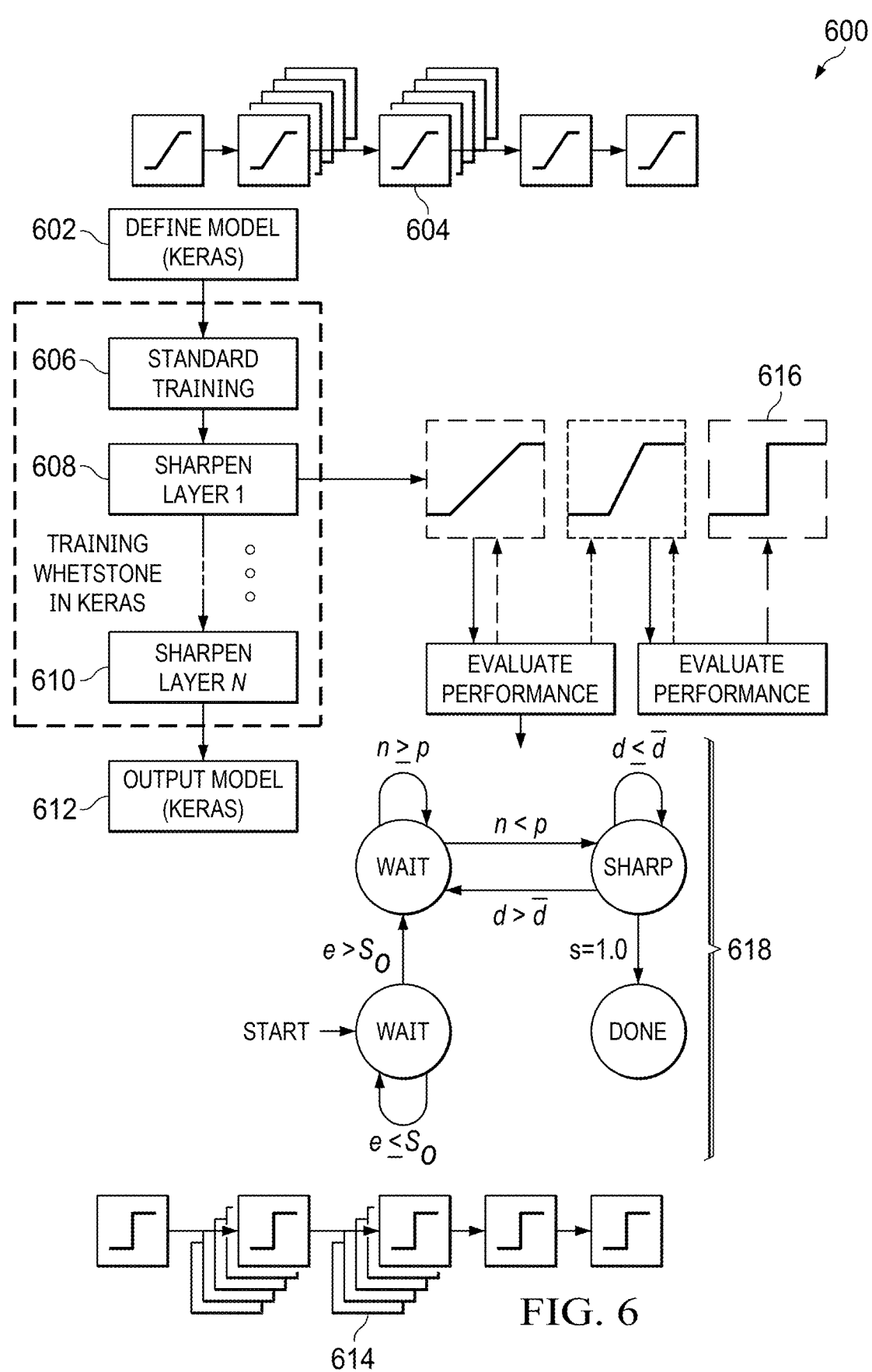
FIG. 6 depicts a diagram illustrating an overview of training a threshold activation spiking network in accordance with an illustrative embodiment.
Figure 7:
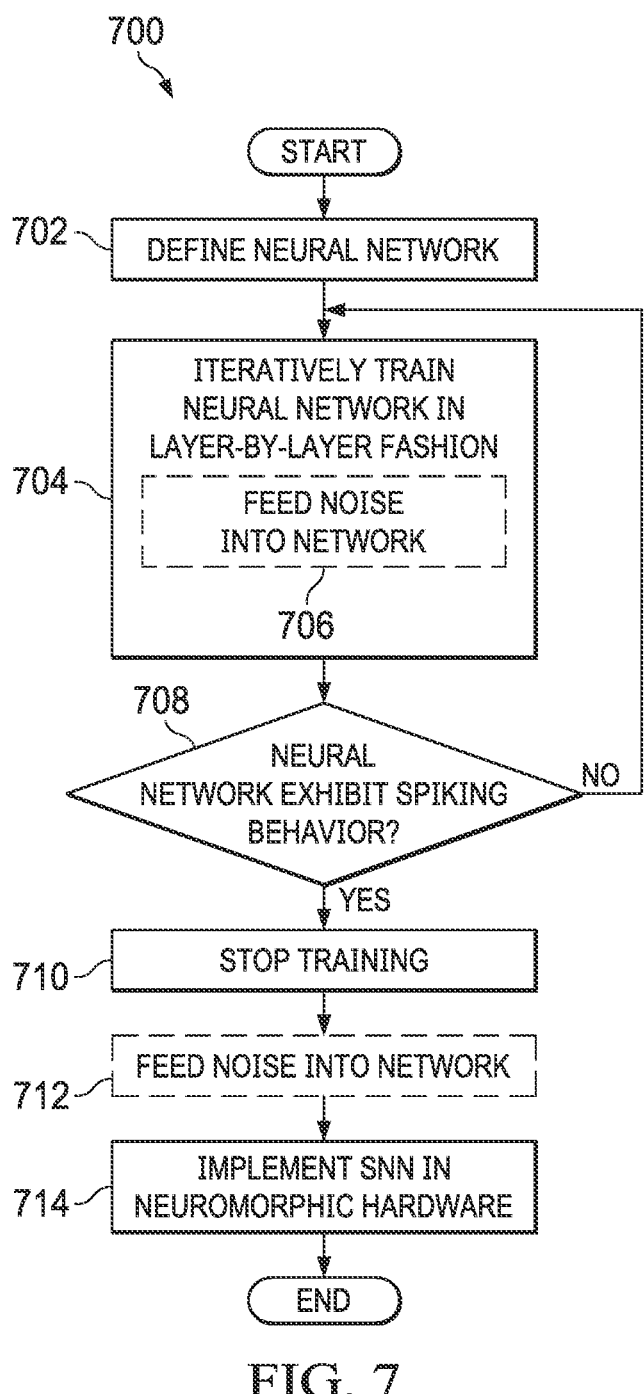
FIG. 7 depicts a flowchart illustrating a process for increasing neural network robustness in accordance with illustrative embodiments.

The network model is then trained to operate as a spiking network 506 (see FIGS. 6 and 7). This training process provides a drop-in mechanism for tailoring a deep neural network to a spiking hardware platform or other binary threshold activation platforms.

After training of the spiking network 506, that network might be implemented in spiking (neuromorphic) hardware 508. Examples of neuromorphic hardware in which the spiking network 506 can be implemented include Loihi and Spiking Neural Network Architecture (SpiNNaker) chips.

Spiking network 506 can also be tested with radiation simulations 510. To understand radiation effects on networks, noise can be injected into the network 506 (see FIG. 7). Simulation might comprise mapping all memory to physical locations, wherein all operations are trued fixed point evaluations with mixed precision. Each memory can be wrapped using noise generators, and evaluated for transient upsets (i.e., values are read with error), or progressive degradation (i.e., values are corrupted during storage).

FIG. 6 depicts a diagram illustrating an overview of training a threshold activation spiking network in accordance with an illustrative embodiment. The illustrative embodiments provide a method for training binary, threshold-activation SNNs using existing deep learning methods. The illustrative embodiments operate by incorporating the conversion into binary activations directly into the training process. Because most techniques to train ANNs rely on stochastic gradient descent methods, it is necessary that the activations of neurons be differentiable during the training process. However, as networks become trained, the training process is able to incorporate additional constraints, such as targeting discrete communication between nodes. With this shift of the optimization target in mind, the illustrative embodiments gradually push the network towards discrete spike activations by shifting the gradient of bounded rectified linear unit (bRELU) activation functions incrementally towards a discrete perceptron-like step function, then fine-tuning the network to account for any loss as a result of that conversion.

Process 600 begins by defining a conventional network architecture 602 within Keras. This network architecture comprises a number of layers with ramped bRELU activation functions 604. After defining the network architecture, process 600 first performs normal network training 606 until performance begins to plateau. Process 600 then sharpens each layer one at a time, beginning with the input layer 608.

Sharpening 616 is implemented within each layer by adjusting neurons' bRELU activation functions while continuing training to have a progressively steeper slope. In the standard training of ANNs, for any given layer, a specific and static activation function is pre-determined. Common activation functions include tan h, sigmoid, and RELUs. In current practice, RELUs have become the standard due to their quick, reliable training and high network performance. In contrast, the illustrative embodiments treat this activation function as dynamic throughout the training process. In place of a static activation function, the illustrative embodiments update the activation while training progresses by using a sequence of bounded, continuous functions hi:R→ [0, 1] such that hi approaches the Heaviside function denoted as h. The Heaviside function is a specific parameterization of the threshold activations present on neuromorphic platforms, and each intermediate activation function is amenable to standard stochastic gradient descent methods.

Experimentation has shown that reliable and accurate convergence is possible in a wide variety of networks. Additionally, in practice it is often beneficial to leave the definition of hi for training time determination, although the core concept remains unchanged. The convergent activation method is applicable to a variety of originating activation functions. bRELUs have been shown to be as effective or nearly as effective as RELUs, and the bounded range allows them to be easily converted to a spiking threshold function. The illustrative embodiments parameterize the units as:

$$h_{\alpha,\beta} = \begin{pmatrix} 1, & \text{if } x_i \geq \beta \\ (x_i - \alpha)/(\beta - \alpha) & \text{if } \alpha \leq x_i < \beta \\ 0, & \text{if } x_i < \alpha \end{pmatrix}$$

and assert that $\alpha < \beta$ and $|\beta - 0.5| = |\alpha - 0.5|$. With $\alpha = 0$ and $\beta = 1$, $h\alpha,\beta$ is a standard bRELU. However, as $\alpha$ tends towards 0.5, $h\alpha,\beta$ approaches the Heaviside function. After an initial period of conventional training, the spiking bRELUs are sharpened by reducing the difference between $\alpha$ and $\beta$. The rate and method of convergence can be determined either before training or dynamically during training.

The sharpening process 616 is automated and performed layer by layer according to an adaptive sharpening schedule 618. By gradually sharpening neurons' activations layer by layer, the network can slowly approach an SNN that has minimal loss from the full-precision case. Research of training schedules has shown that sharpening the network from the bottom up is more stable than the top-down approach, which is likely due to the backwards flow of gradients during training; if top layers are sharpened first, all the nodes in the networks have reduced gradient information.

The adaptive sharpening 618 is inspired by an error-guided closed-loop control system and uses the training loss to dampen the sharpening rate, freeing the user from having to craft a sharpening schedule manually. At the end of each epoch, the adaptive sharpener looks at the percentage increase in loss d (degradation) and determines whether to sharpen during the next epoch or pause so the performance can stabilize. If the loss increases by more than a specified percentage (i.e., increase in loss d above the critical threshold d̃), then sharpening is halted, causing a transition to the waiting cycle.

When in a non-sharpening state (waiting), if the loss fails to improve more than a certain percentage after a certain number of epochs (i.e., there have been p consecutive epochs without significant improvement per the η counter), then sharpening resumes.

The sharpening rate is specified as the amount per layer per epoch, where the amount is a floating-point value less than or equal to 1.0. For example, if the sharpening rate is set to 0.25, then it will take four epochs in the sharpening state to completely sharpen one layer. The sharpness of a layer is altered at the end of each batch, providing a more gradual transition than if it were altered at the end of each epoch. Experience suggests that frequent, small updates are beneficial. Transition rules are only evaluated at the end of each training epoch. The sharpening process continues to the last layer N 610 and terminates when all layers of the model have been fully sharpened (i.e., the model reaches a sharpness s of 1.0 (100%)).

The output network 612 is a conventional neural network that requires one time-step per layer and spiking-compatible discrete activation functions 614.

FIG. 7 depicts a flowchart illustrating a process for increasing neural network robustness in accordance with illustrative embodiments. Process 700 might be implemented in hardware, software, or both. When implemented in software, the process can take the form of program code that is run by one of more processors located in one or more hardware devices in one or more computer systems. Process 700 might be implemented in hybrid training and processing system 400 shown in FIG. 4 using ANNs such as ANN 300 shown in FIG. 3.

Process 700 beings by defining an artificial neural network, wherein the artificial neural network comprises a number of bounded ramp activation functions (step 702). The artificial neural network is then iteratively trained in a layer-by-layer fashion (step 704) (see FIG. 6). Each iteration of training increases the slope of the bounded ramp activation functions toward a discrete threshold activation.

Optionally, noise might be fed into the artificial neural network during training (step 706). Several parameters might be adjusted in response to the noise during training. For example, neural network hyperparameters might be adjusted in response to the noise. The training data set might also be adjusted. Node weights in the neural network can be automatically optimized in response to the noise.

Training continues until the activation functions converge to the threshold activation and the artificial neural network exhibits spiking behavior (step 708).

When the artificial neural network exhibits spiking behavior, the training stops (step 710). Optionally, noise may be fed into the neural network after training to test robustness (step 712).

The SNN is implemented in neuromorphic hardware (step 714). Process 700 then ends.

Neural architecture search (NAS) has emerged as an algorithmic method of developing network architectures. For SNNs, Evolutionary Optimization for Neuromorphic Systems (EONS), is able to generate networks compatible on neuromorphic hardware. Weight Agnostic Neural Networks (WANNs) are inspired by the fact precocial species can carry out several tasks at birth, without any training. For architecture search methods, the training of each generated neural network is expensive. WANNs use an iterative topology search algorithm wherein the weights are not adjusted through training, and instead uses a set of fixed shared weights for every weight in the network (i.e., weight agnostic). Training optimizes the topology of the network for maximal performance and small network size over the fixed weights and a large set of activation functions. The available activation functions include linear, threshold, cosine, Gaussian, tan h, sigmoid, inverse, absolute value, and rectified linear unit (ReLU). WANNs pursue circuit motifs that perform well due to the structure of the network and not the weight values themselves.

Figure 8:
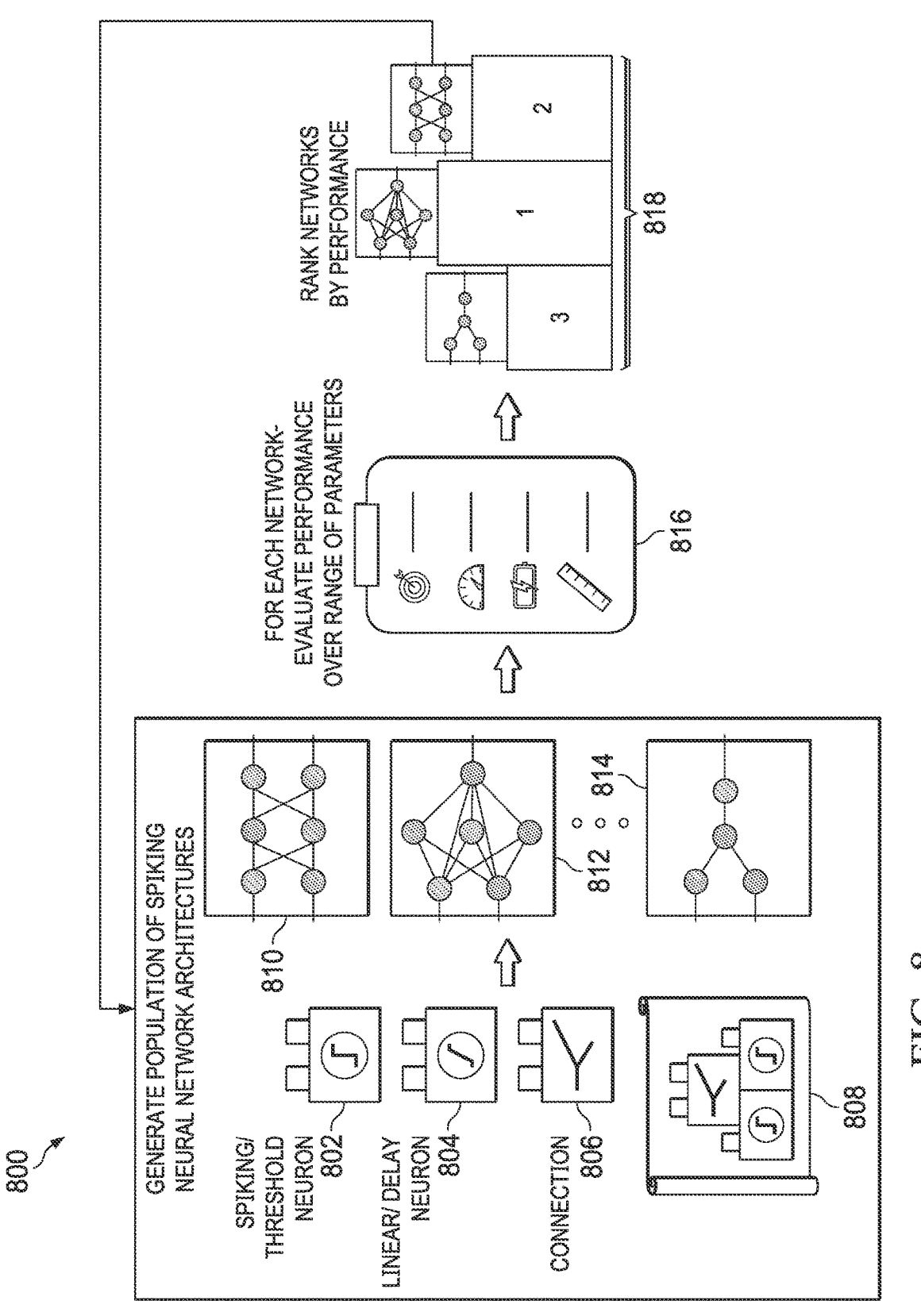
FIG. 8 depicts a diagram illustrating a process of deriving spiking networks from WANNs in accordance with an illustrative embodiment.

FIG. 8 depicts a diagram illustrating a process of deriving spiking networks from WANNs in accordance with an illustrative embodiment. Process 800 uses the above methodology specifically over threshold and linear activation functions to generate sparse topologies compatible with neuromorphic hardware.

Spiking/threshold neurons 802 and linear/delay neurons 804 are combined using connections 806. Process 800 combines the neurons 802, 804 and connections 806 according to predefined rules to arrive at a unique "blueprint" 808 for a network architecture. A number of spiking neural network architectures 810, 812, 814 can be generated in this manner, each with its own corresponding blueprint 808.

Each of the spiking network architectures 810, 812, 814 is evaluated over a number of parameters 816 such as, e.g., accuracy, speed, energy consumption, and size/complexity. The networks 810, 812, 814 are then ranked 818 by performance.

As an extreme example environment, space-based computing must overcome sensor and hardware noise due to radiation and other factors. This factor motivates generating sparse neural networks that are resilient to noise. Since the methodology of the illustrative embodiments is weight agnostic, the resultant topology demonstrates noise resilience in the input space and the synaptic weights. Spiking WANNs show promise in various control and classification tasks, comparing factors such as performance, scale, and computational costs. Noise is added to the input and synaptic weights for these tasks at varying levels to analyze the noise robustness of Spiking WANNs. Accordingly, these results offer promise for neuromorphic computing to impact many space computing tasks.

FIG. 9 depicts a flowchart illustrating a process for increasing neural network robustness in accordance with illustrative embodiments. Process 900 might be implemented in hardware, software, or both. When implemented in software, the process can take the form of program code that is run by one of more processors located in one or more hardware devices in one or more computer systems. Process 900 might be implemented in hybrid training and processing system 400 shown in FIG. 4 using ANNs such as ANN 300 shown in FIG. 3 system 200 shown in FIG. 2 and might be an example of process 800 in FIG. 8.

Process 900 begins by creating a number of minimal weight agnostic neural networks 802 (step 902). The nodes in the neural networks comprise fixed shared weights. Process 900 then identifies a subset of the neural networks that comprises activation functions compatible with neuromorphic hardware (step 904). The activation functions in this subset of neural networks might be linear functions or threshold activation functions.

Each neural network in the subset is tested in with a specified number of shared weight values (step 906), and a score is generated for each combination of a neural network in the subset and a shared weight value (step 908). The score may be based on performance and complexity in mapping the neural networks to neuromorphic hardware.

The neural networks in the subset are ranked according to their respective scores (step 910). Neural networks from the subset are then combined according to ranking to create a new network that exhibits spiking behavior (step 912).

Process 900 then ends.

Figure 10:
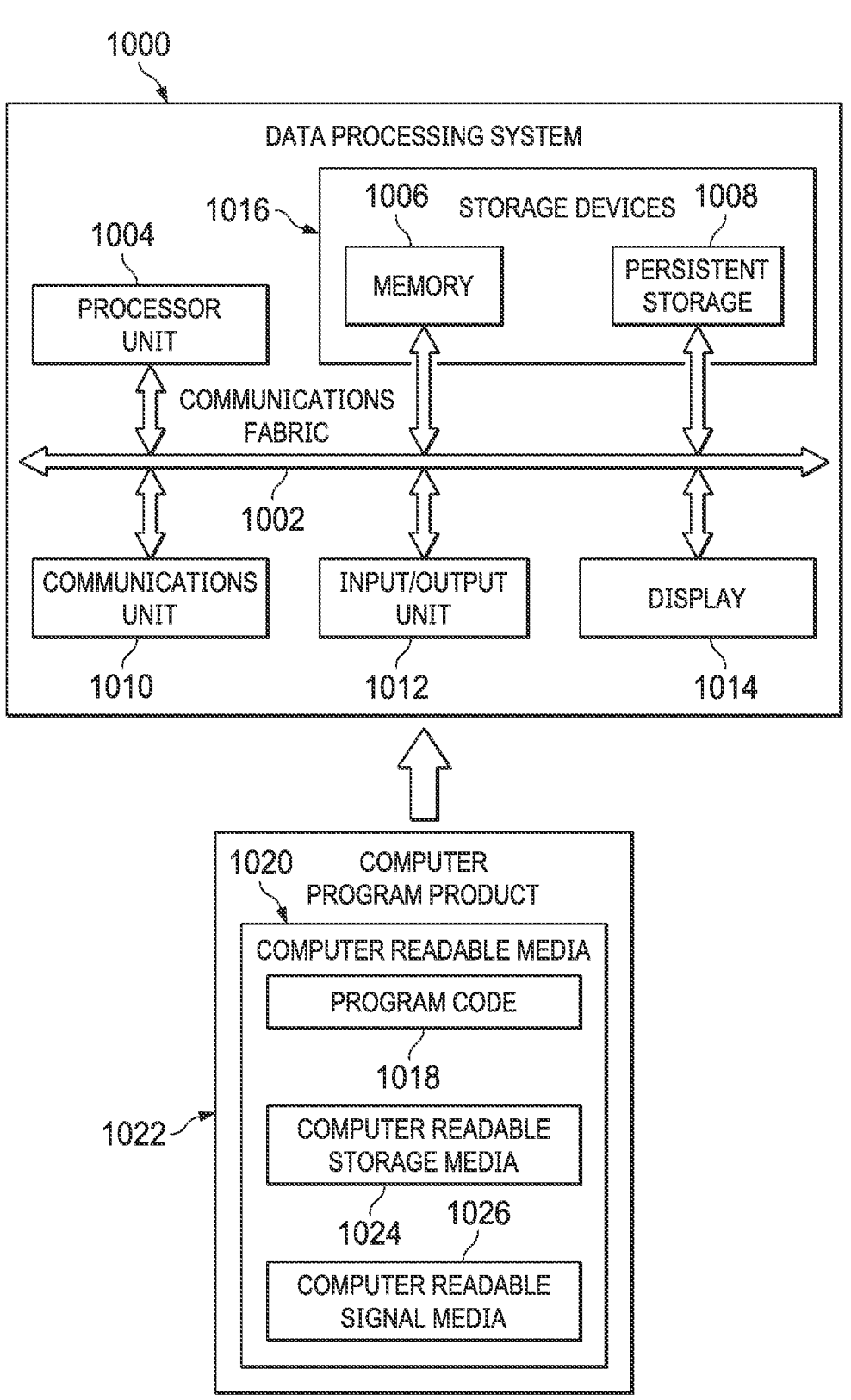
FIG. 10 is a diagram of a data processing system depicted in accordance with an illustrative embodiment.

Turning now to FIG. 10, an illustration of a block diagram of a data processing system is depicted in accordance with an illustrative embodiment. Data processing system 1000 may be used to implement hybrid training and processing system 400 in FIG. 4. In this illustrative example, data processing system 1000 includes communications framework 1002, which provides communications between processor unit 1004, memory 1006, persistent storage 1008, communications unit 1010, input/output unit 1012, and display 1014. In this example, communications framework 1002 may take the form of a bus system.

Processor unit 1004 serves to execute instructions for software that may be loaded into memory 1006. Processor unit 1004 may be a number of processors, a multi-processor core, or some other type of processor, depending on the particular implementation. In an embodiment, processor unit 1004 comprises one or more conventional general-purpose central processing units (CPUs). In an alternate embodiment, processor unit 1004 comprises one or more graphical processing units (GPUs).

Memory 1006 and persistent storage 1008 are examples of storage devices 1016. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1016 may also be referred to as computer-readable storage devices in these illustrative examples. Memory 1016, in these examples, may be, for example, a random access memory or any other suitable volatile or non-volatile storage device. Persistent storage 1008 may take various forms, depending on the particular implementation.

For example, persistent storage 1008 may contain one or more components or devices. For example, persistent storage 1008 may be a hard drive, a flash memory, a rewritable optical disk, a rewritable magnetic tape, or some combination of the above. The media used by persistent storage 1008 also may be removable. For example, a removable hard drive may be used for persistent storage 1008. Communications unit 1010, in these illustrative examples, provides for communications with other data processing systems or devices. In these illustrative examples, communications unit 1010 is a network interface card.

Input/output unit 1012 allows for input and output of data with other devices that may be connected to data processing system 1000. For example, input/output unit 1012 may provide a connection for user input through at least one of a keyboard, a mouse, or some other suitable input device. Further, input/output unit 1012 may send output to a printer. Display 1014 provides a mechanism to display information to a user.

Instructions for at least one of the operating system, applications, or programs may be located in storage devices 1016, which are in communication with processor unit 1004 through communications framework 1002. The processes of the different embodiments may be performed by processor unit 1004 using computer-implemented instructions, which may be located in a memory, such as memory 1006.

These instructions are referred to as program code, computer-usable program code, or computer-readable program code that may be read and executed by a processor in processor unit 1004. The program code in the different embodiments may be embodied on different physical or computer-readable storage media, such as memory 1006 or persistent storage 1008.

Program code 1018 is located in a functional form on computer-readable media 1020 that is selectively removable and may be loaded onto or transferred to data processing system 1000 for execution by processor unit 1004. Program code 1018 and computer-readable media 1020 form computer program product 1022 in these illustrative examples. In one example, computer-readable media 1020 may be computer-readable storage media 1024 or computer-readable signal media 1026.

In these illustrative examples, computer-readable storage media 1024 is a physical or tangible storage device used to store program code 1018 rather than a medium that propagates or transmits program code 1018. Computer readable storage media 1024, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 1018 may be transferred to data processing system 1000 using computer-readable signal media 1026. Computer-readable signal media 1026 may be, for example, a propagated data signal containing program code 1018. For example, computer-readable signal media 1026 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1000 are not meant to provide architectural limitations to the manner in which different embodiments may be implemented. The different illustrative embodiments may be implemented in a data processing system including components in addition to or in place of those illustrated for data processing system 1000. Other components shown in FIG. 10 can be varied from the illustrative examples shown. The different embodiments may be implemented using any hardware device or system capable of running program code 1018.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of increasing a robustness of a neural network, the method comprising providing a drop-in mechanism for tailoring a deep neural network into a spiking hardware platform or other binary threshold activation platform by using a number of processors to perform the steps of:

defining an artificial neural network, wherein the artificial neural network is weight agnostic and comprises a number of bounded ramp activation functions;

iteratively training the artificial neural network into a spiking network in a layer-by-layer fashion, wherein each iteration of training increases g slope of the bounded ramp activation functions toward a discrete threshold activation, wherein iterations of training incorporate constraints selectively targeting discrete communication between nodes and thereby pushing the artificial neural network towards discrete spike activations shifting a gradient of bounded rectified linear unit activations incrementally toward a discrete perceptron-like step followed by fine-tuning of the artificial neural network to account for any losses while pushing towards the discrete spike activations;

stopping training of the artificial neural network when the number of bounded ramp activation functions converge to the discrete threshold activation and the artificial neural network exhibits spiking behavior;

implementing the spiking network in neuromorphic hardware; and testing the spiking network for transient upsets or progressive degradation by injecting noise into the neural network by wrapping a memory using a noise generator.

2. The method of claim 1, further comprising feeding noise into the neural network during training and, responsive to the noise, adjusting hyperparameters of the artificial neural network.

3. The method of claim 2, further comprising adjusting neural network hyperparameters in response to the noise.

4. The method of claim 2, further comprising adjusting a training dataset in response to the noise.

5. The method of claim 2, further comprising modifying an output of an artificial neuron responding to the noise by adjusting node weights automatically.

6. The method of claim 1, further comprising feeding noise into the neural network after training.

7. A computer program product configured to increase a robustness of a neural network that provides a drop-in mechanism configured to tailor a deep neural network into a spiking hardware platform or other binary threshold activation platform, wherein the computer program product comprises:

a computer-readable storage medium having that comprises program instructions embodied thereon and configured to:

define an artificial neural network, wherein the artificial neural network is weight agnostic and comprises a number of bounded ramp activation functions;

iteratively train the artificial neural network into a spiking network in a layer-by-layer fashion, wherein each iteration of training increases a slope of the bounded ramp activation functions toward a discrete threshold activation, wherein iterations of training incorporate constraints that selectively target discrete communication between nodes and thereby push the artificial neural network towards discrete spike activations that shift a gradient of bounded rectified linear unit activations incrementally toward a discrete perceptron-like step;

fine-tune the artificial neural network to account for any losses incorporated into the push towards the discrete spike activations;

stop a training of the artificial neural network when the number of bounded ramp activation functions converge to the discrete threshold activation and the artificial neural network exhibits spiking behavior;

implement the spiking network in neuromorphic hardware; and test the spiking network for transient upsets or progressive degradation with an injection of noise into the neural network with a memory wrapped by a noise generator.

8. The computer program product of claim 7, further comprising instructions for feeding noise into the neural network during training.

9. The computer program product of claim 7, further comprising instructions for feeding noise into the neural network after training.

10. A system configured to increase a robustness of a neural network based upon a drop-in mechanism configured to tailor a deep neural network into a spiking hardware platform or other binary threshold activation platform robustness, wherein the system comprises:

a storage device configured to store program instructions; and one or more processors operably connected to the storage device and configured to execute the program instructions configured to cause the system to:

define an artificial neural network, wherein the artificial neural network is weight agnostic and comprises a number of bounded ramp activation functions;

iteratively train the artificial neural network into a spiking network in a layer-by-layer fashion, wherein each iteration of training increases a slope of the bounded ramp activation functions toward a discrete threshold activation, wherein iterations of training incorporate constraints that selectively target discrete communication between nodes and thereby push the artificial neural network towards discrete spike activations that shift a gradient of bounded rectified linear unit activations incrementally toward a discrete perceptron-like step;

fine-tune the artificial neural network to account for any losses incorporated into the push towards the discrete spike activations;

stop a training of the artificial neural network when the number of bounded ramp activation functions converge to the discrete threshold activation and the artificial neural network exhibits spiking behavior;

implement the spiking network in neuromorphic hardware; and test the spiking network for transient upsets or progressive degradation with an injection of noise into the neural network with a memory wrapped by a noise generator.

11. The system of claim 10, wherein noise is fed into the neural network during training.

12. The system of claim 10, wherein noise is fed into the neural network after training.

13. A method of increasing a robustness of a neural network, the method comprising using a number of processors providing a drop-in mechanism for tailoring a neural network into a spiking hardware platform or other binary threshold activation platform by performing the steps of:

using iterations of training that incorporate constraints selectively targeting discrete communication between nodes and thereby pushing the neural network towards discrete spike activations shifting a gradient of bounded rectified linear unit activations incrementally toward a discrete perceptron-like step followed by fine-tuning of the neural network to account for any losses while pushing towards the discrete spike activations for creating a number of minimal weight agnostic neural networks, wherein nodes in the number of minimal weight agnostic neural networks comprise fixed shared weights;

identifying a subset of the number of minimal weight agnostic neural networks that comprise activation functions compatible with neuromorphic hardware;

implementing a spiking network in the neuromorphic hardware;

testing each neural network in the subset with a specified number of shared weight values for transient upsets or progressive degradation by injecting noise into the neural network by wrapping a memory using a noise generator;

generating a score for each combination of a neural network in the subset and a shared weight value, wherein the score is based on performance and complexity in mapping to neuromorphic hardware;

ranking all neural networks in the subset according to their respective scores; and combining neural networks from the subset according to ranking to create a new network that exhibits spiking behavior.

14. The method of claim 13, wherein the activation functions in the subset of neural networks comprise linear functions and threshold activation functions.

15. The method of claim 13, wherein the subset of neural networks are tested according to parameters comprising at least one of:

accuracy;

speed;

energy consumption; or size and complexity.

16. A computer program product configured to increase a robustness of a neural network, based upon a drop-in mechanism configured to tailor a deep neural network into a spiking hardware platform or other binary threshold activation platform and the computer program product comprising a computer-readable storage medium that comprises program instructions configured to perform the steps of:

selectively targeting, based on iterations of training incorporating constraints, discrete communication between nodes and thereby push the neural network towards discrete spike activations that shift a gradient of bounded rectified linear unit activations incrementally toward a discrete perceptron-like step followed by a fine-tuning of the neural network to account for any losses while pushing towards the discrete spike activations for creating a number of minimal weight agnostic neural networks, wherein nodes in the number of minimal weight agnostic neural networks comprise fixed shared weights;

identifying a subset of the number of minimal weight agnostic neural networks that comprise activation functions compatible with neuromorphic hardware;

implementing a spiking network in the neuromorphic hardware;

testing each neural network in the subset with a specified number of shared weight values for transient upsets or progressive degradation by injecting noise into the neural network by wrapping a memory using a noise generator;

generating a score for each combination of a neural network in the subset and a shared weight value, wherein the score is based on performance and complexity in mapping to neuromorphic hardware;

ranking all neural networks in the subset according to their respective scores; and combining neural networks from the subset according to ranking to create a new network that exhibits spiking behavior.

17. The computer program product of claim 16, wherein the activation functions in the subset of neural networks comprise linear functions and threshold activation functions.

18. The computer program product of claim 16, wherein the subset of neural networks are tested according to parameters comprising at least one of:

accuracy;

speed;

energy consumption; or size and complexity.

19. A system configured to increase a robustness of a neural network based upon a drop-in mechanism configured to tailor a deep neural network into a spiking hardware platform or other binary threshold activation platform, the system comprising:

a storage device configured to store program instructions; and one or more processors operably connected to the storage device and configured to execute the program instructions to cause the system to:

create a number of minimal weight agnostic neural networks, wherein nodes in the number of minimal weight agnostic neural networks comprise fixed shared weights by using iterations of training that incorporate constraints that electively target discrete communication between nodes and thereby push the number of minimal weight agnostic neural networks towards discrete spike activations that shift a gradient of bounded rectified linear unit activations incrementally toward a discrete perceptron-like step followed by a fine-tuning of the number of minimal weight agnostic neural network that accounts for any losses while pushing towards the discrete spike activations;

identify a subset of the number of minimal weight agnostic neural networks that comprise activation functions compatible with neuromorphic hardware;

implement a spiking network in neuromorphic hardware;

test each neural network in the subset with a specified number of shared weight values for transient upsets or progressive degradation with an injection of noise into the neural network with a memory wrapped by a noise generator;

generate a score for each combination of a neural network in the subset and a shared weight value, wherein the score is based on performance and complexity in mapping to neuromorphic hardware;

rank all neural networks in the subset according to their respective scores; and combine neural networks from the subset according to ranking to create a new network that exhibits spiking behavior.

20. The system of claim 19, wherein the activation functions in the subset of neural networks comprise linear functions and threshold activation functions.

21. The system if claim 19, wherein the subset of neural networks are tested according to parameters comprising at least one of:

accuracy;

speed;

energy consumption; or size and complexity.

* * * * *